United States Patent [19]

Bose

[11] Patent Number: 5,007,233
[45] Date of Patent: Apr. 16, 1991

[54] MULTIWALL BAG AND METHOD OF PACKAGING UTILIZING MULTIWALL BAGS

[75] Inventor: Ajit K. Bose, Lawrenceville, N.J.

[73] Assignee: Union Camp Corporation, Wayne, N.J.

[21] Appl. No.: 401,336

[22] Filed: Aug. 31, 1989

[51] Int. Cl.$^5$ .............................................. B65B 7/06
[52] U.S. Cl. ...................................... 53/449; 53/474; 53/479; 53/482
[58] Field of Search ............... 53/449, 479, 481, 482, 53/175, DIG. 2, 474

[56] References Cited

U.S. PATENT DOCUMENTS

| | | | |
|---|---|---|---|
| 2,522,200 | 9/1950 | Southwick | 53/449 |
| 3,190,441 | 6/1965 | Rausing | 53/449 X |
| 3,385,024 | 5/1968 | Piazze | 53/449 |
| 3,720,559 | 3/1973 | Odom | 53/482 X |
| 3,988,873 | 11/1976 | Oliverius | 53/449 |

FOREIGN PATENT DOCUMENTS 2812137  9/1979  Fed. Rep. of Germany ... 53/DIG. 2

Primary Examiner—John Sipos
Attorney, Agent, or Firm—Edward J. Sites

[57] ABSTRACT

A multiwall bag and method of packaging using a multiwall bag are described. The multiwall bag includes an outer paper bag having an uncoated inner surface. One or more thermoplastic bags containing one or more bulk materials are ultrasonically sealed closed, simultaneously green tacking a small portion of the outer surface of such thermoplastic bags to the inner surface of the paper bag. The open end of the paper bag is then closed and folded back on itself with a small amount of adhesive being applied to keep the paper bag closed. As a result, the paper bag is easily opened and the thermoplastic bags can be quickly removed therefrom for wholesale use in compatible processes.

10 Claims, 2 Drawing Sheets

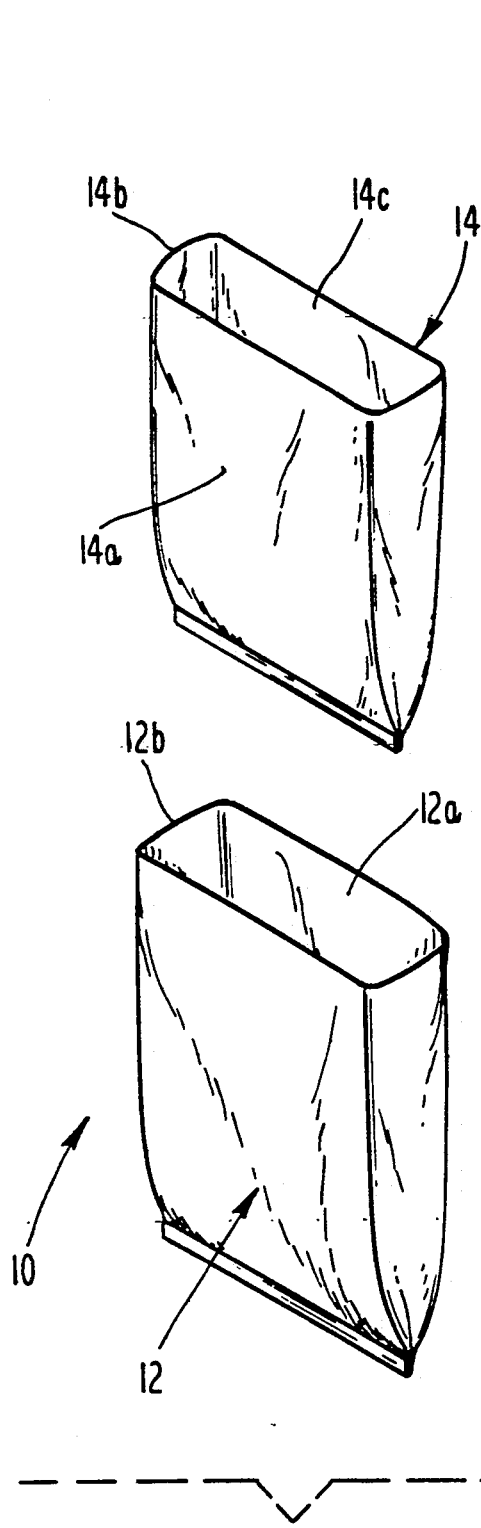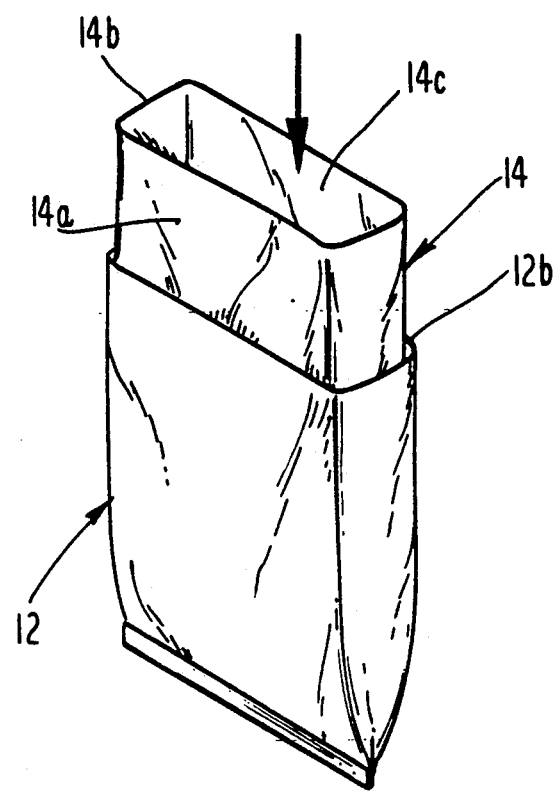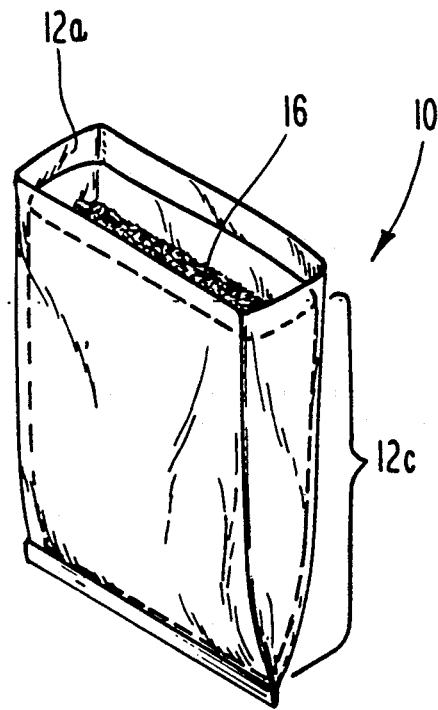

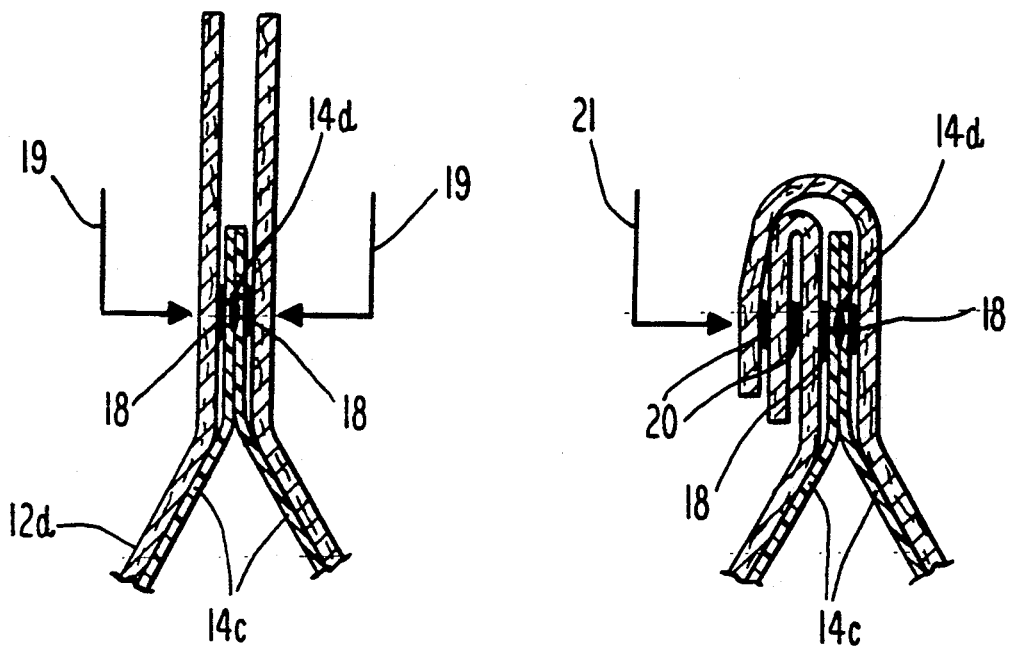
*Fig.4*  *Fig.5*
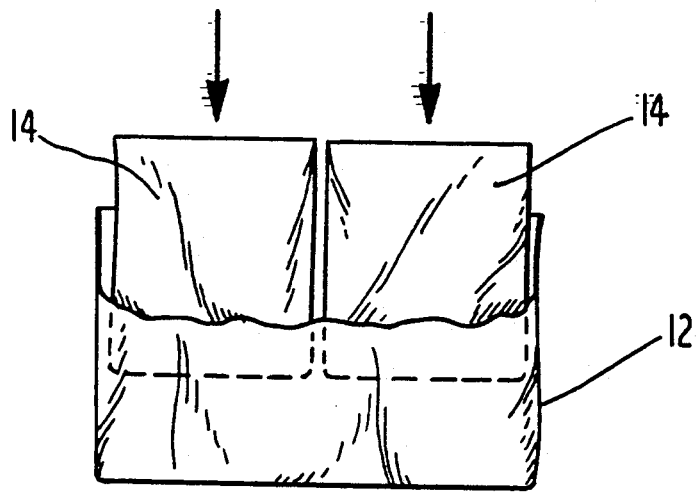
*Fig.6*

MULTIWALL BAG AND METHOD OF PACKAGING UTILIZING MULTIWALL BAGS

BACKGROUND OF THE INVENTION

1. Field of the Invention

This invention is related generally to packages and methods of packaging, and more particularly to multiwall bags and methods of packaging utilizing a multiwall bag.

2. Statement of the Prior Art

Multiwall bags are well known in the packaging art. Such bags typically comprise a laminated product formed of one or more paper plies interspersed by one or more layers of thermoplastic film. For example, low density ethylene-vinyl acetate is utilized in conjunction with kraft paper to provide a multiwall bag having the desirable property of strength, while high density materials are utilized in conjunction with the same kraft paper to provide a multiwall bag having the desirable property as a moisture barrier. After having been filled with a bulk material, these multiwall bags are mostly often sealed by sewing their opened end closed.

The strength and moisture barrier properties that are provided by such known multiwall bags are virtually indisputable. However, because of such strength and the sewn-closed nature of their sealed ends, multiwall bags that have been used in the prior art are very difficult to open. It would, therefore, be preferable to provide a multiwall bag having the same desirable properties of prior art multiwall bags, but additionally would be easy to open.

SUMMARY OF THE INVENTION

A multiwall bag is provided for containing a bulk material, comprising generally a paper bag having a closed end, an open end, an outer surface, and an inner surface, and at least one thermoplastic bag also having a closed end, an open end, an outer surface and an inner surface.

In accordance with a first important aspect of the present invention, at least one thermoplastic bag is disposed within the paper bag in such a manner that its outer surface is in substantially unbonded contiguous contact with the inner surface of the paper bag. In accordance with another important aspect of the present invention, the thermoplastic bag within which the bulk material is contained has its inner surface closed at its open end by ultrasonic means. The ultrasonic sealing energy is applied through the outer paper ply or face of the bag after filling of the thermoplastic bag.

In accordance with yet another important aspect of this invention, a method of packaging is also disclosed utilizing a multiwall bag. Such a method first involves the steps of providing a paper bag having a closed end, an open end, an outer surface, and an inner surface substantially free of any coating, and providing one or more thermoplastic bags, each thermoplastic bag having a closed end, an open end, an outer surface and an inner surface. Each thermoplastic bag is then inserted within the paper bag in such a manner that the outer surface of each thermoplastic bag is in substantially contiguous contact with the inner surface of the paper bag.

Thereafter, each thermoplastic bag is substantially filled with a bulk material through its respective open end, and the inner surface at the open end of each of the filled thermoplastic bags is caused to be closed. In accordance with yet another important aspect of the present invention, the closed inner surface of each of the filled thermoplastic bags is caused to be brought into operative contact with ultrasonic welding means which are provided. The closed inner surface of each of the filled thermoplastic bags is then sealed by the ultrasonic means. An adhesive is then provided on a portion of the outer surface of the paper bag beneath the closed inner surface, and finally the outer surface of the paper bag is folded back on itself to adhere a portion thereof to the adhesive.

The above and other objects, advantages and novel features according to the present invention will become more apparent from the following detailed description of a preferred embodiment thereof, when considered in conjunction with the accompanying drawings wherein:

BRIEF DESCRIPTION OF THE DRAWINGS

FIG. 1 diagrammatically illustrates in exploded format a multiwall bag comprising an outer, uncoated paper bag and an inner bag formed of a thermoplastic film in accordance with the present invention;

FIG. 2 shows an insertion step of the method of packaging which utilizes the multiwall bag illustrated in FIG. 1;

FIG. 3 illustrates the filled inner bag which results from a filling step which follows the insertion step shown in FIG. 2;

FIG. 4 shows a step for sealing the inner bag in accordance with the method of packaging of the present invention;

FIG. 5 illustrates a closing step which follows the sealing step shown in FIG. 4; and FIG. 6 shows a multiwall bag comprising an outer, uncoated paper bag and a plurality of inner bags, each of which inner bags is formed of a thermoplastic film in accordance with another embodiment of the present invention.

DETAILED DESCRIPTION OF THE PREFERRED EMBODIMENT

Referring now to the drawings, wherein like numbers designate like or corresponding parts throughout each of the several views, there is shown in FIG. 1 a multiwall bag 10 comprising an outer, uncoated paper bag 12 and an inner bag 14 formed of a thermoplastic film. The outer, uncoated paper bag 12, for example, may comprise a kraft paper of suitable basis weight. In accordance with the preferred embodiment of the present invention, the paper bag 12 has a basis weight of from about forty pounds per 3,000 square feet to about sixty pounds per 3,000 square feet. As will become more apparent from the explanation hereinbelow, the paper bag 12 is uncoated according to a first important aspect of the present invention.

The inner bag 14 preferably comprises a copolymer of ethylene-vinyl acetate, or low density or high density polyolefins. As is well known, ethylene-vinyl acetate copolymers are derived from conventional low density polyethylene (LDPE) technology. Ethylene-vinyl acetate (EVA) describes a family of thermoplastic polymers racing from about 5% to 50% by weight of vinyl acetate incorporated into an ethylene chain. Copolymers containing less than 5% vinyl acetate are classified as polyethylene (50%) or modified polyethylene, while above 50% vinyl acetate they are classified as vinyl acetate-ethylene (VAE) copolymers. As is also well known, the addition of vinyl acetate reduces polymer crystallinity, which increases flexibility and reduces hardness.

The combination of desirable properties of high clarity, puncture resistance, impact strength, and low heat-seal temperature make EVA copolymers nearly ideal candidates for use in flexible packaging. Shrink wrap, heavy-duty shipping sacks, produce bags, and bag-in-box are typical examples. One problem that has been experienced with such conventional thermoplastic films when they are incorporated with one or more paper plies into multiwall bags of the prior art, however, is that they are difficult to open. Therefore, in accordance with one important aspect of this invention, the inner, thermoplastic bag 14 is inserted as shown in FIG. 2 within the outer, paper bag 12 such that the outer surface 14a of the thermoplastic bag 14 is substantially contiguously in contact with the ply of uncoated paper on the inner surface 12a of the paper bag 12 as shown in FIG. 3, but is not bonded thereto.

It should be noted at this juncture that the inner, thermoplastic bag 14, after insertion within the outer, paper bag 12, is substantially coextensive therewith. However, as is shown in FIG. 3, once a bulk material 16 is loaded into the open ends 12b, 14b of the paper bag 12 and thermoplastic bag 14, respectively, it is readily apparent that the thermoplastic bag 14 only extends along a major portion 12c of the paper bag 12.

Referring now to FIGS. 4 and 5, the steps of closing and sealing the multiwall bag 10 will now be explained. The inner surface 14c at the open end 14b of the filled thermoplastic bag 14 is first caused to be closed. Thereafter, in accordance with yet another important aspect of the present invention, the closed inner surface 14c of the filled thermoplastic bag 14 is caused to be brought operatively into contact with ultrasonic welding means 19 (shown diagrammatically as arrows in FIG. 4). Thus, with bag ends 12b and 12c held closed as shown in FIG. 4, ultrasonic welding means 19 are positioned outside of outer surfaces 14a, and ultrasonic energy applied through the outside bag 12 to the closed end of bag 14, to seal the inner surface 14c near the top thereof at about the position indicated by the joint 14d.

Ultrasonic assemblies with conventional ultrasonic welding means are known for their ability to weld thermoplastic parts together substantially permanently without solvents, glues, or mechanical fasteners such as the stitching used in prior art multiwall bags. Typical ultrasonic welders are designed to deliver vibrations at a fixed frequency, usually in the 20 kHz range, into a properly designed set of parts. Some parts weld more easily than others, but a primary consideration is the particular design of the joint.

As is well known, ultrasonic frequencies produce a severe stress at the parts coupling surface (i.e., the joint). Such stress, under pressure, causes a rapid agitation of the joint area which, in turn, creates frictional heat. Usually such a creation of frictional heat is fast and hot enough to melt the plastic in a fraction of a second. As the joint area melts, friction is reduced by the lubrication of the melting flowing plastic. Excessive cycles with the ultrasonic welder will produce flash, though proper joint designs will contain normal overflow of melt.

It has been found by the inventor herein that a straight-line joint 14d that couples the inner surface 14c at the formerly open end 14b of the thermoplastic bag 14 not only provides for a quick and substantially permanent seal for the bulk material 16 that is filled within the thermoplastic bag 14, but also produces a small area of "green tack" 18 between the outer surface 14a of the thermoplastic bag 14 and the uncoated inner surface 12a of the paper bag 12. Such an occurrence of green tack has not been observed with coated papers. As is well known, the green tack 18 permits a temporary hold on the filled thermoplastic bag 14 within the paper bag 12, but is adapted to be broken rather easily. One suitable ultrasonic welding means 19 is manufactured by UltraSonicSeal of Broomall, PA, although many other suitable such ultrasonic welding means are known.

With the closed inner surface 14c of the filled thermoplastic bag 14 having been sealed by the ultrasonic means 19, the inner surface 12a at the open end 12b of the paper bag 12 is caused to be closed by any suitable mechanical means 21 (diagrammatically shown as the arrow in FIG. 5). An adhesive 20 is provided on respective portions of the outer surface 12d of the paper bag 12, as shown in FIG. 5, and finally the outer surface 12d of the paper bag 12 is folded back on itself to adhere a portion thereof to the adhesive 20. Although many suitable adhesives are known, a pressure-sensitive hot melt adhesive is presently preferred in accordance with this invention.

Referring now to FIG. 6, it can be seen that the present invention can be employed with more than one thermoplastic bag 14 within a single paper bag 12. In such a manner, and with the same steps that are used in the method of packaging that utilizes a single, multiwall bag 10 as taught herein above, one or more than one bulk material 16 may be contained within a multiwall bag 10 having more than one thermoplastic bag 14. Furthermore, the thermoplastic bags 14 according to this second embodiment of the present invention may be color-coded with conventional pigments to identify the particular bulk material 16 which it contains.

The thermoplastic bags 14 which are used in the multiwall bags 10 according to the present invention may be made in any conventional manner. However, in both of the preferred embodiments described herein, each of the thermoplastic bags 14 are formed by first extruding a substantially molten thermoplastic through an annular die body. Air is then blown through the extrusion to provide a thermoplastic bag 14 of preselected size, and the thermoplastic bags 14 so formed are then sealed and serrated typically with a conventional hot knife.

For a strong multiwall bag 10, low density EVA is preferred for the thermoplastic bags 14. On the other hand, for a multiwall bag 10 having a moisture barrier property, high density EVA is preferred for each of the thermoplastic bags 14. Other thermoplastics may also be utilized in accordance with the present invention, and in order to provide their particular well known properties.

What has been disclosed above is an improved multiwall bag 10 and method of packaging which utilizes such a multiwall bag 10. The multiwall bag 10 easily opened by breaking the adhesive 20, which action also breaks the green tack 18 holding the one or more thermoplastic bags 14 within the paper bag 12. Each of the thermoplastic bags 14, being unbonded to the paper bag 12, can be easily and quickly unloaded from the paper bag 12, while still containing its bulk material sealed therein.

The advantages of the improved multiwall bag 10 and method of packaging which utilizes such multiwall bag 10 in accordance with the present invention are readily apparent. For example, in the production of commercial titanium dioxide, polyethylene is utilized as a carrier material for the master batch. By using a multiwall bag 10 in accordance with the present invention to contain the titanium dioxide powder, such multiwall bag 10 could be easily opened by production workers and the inner, thermoplastic (i.e., polyethylene) bag 14 containing the titanium dioxide powder could be thrown wholly into the batch without further opening efforts. Because the inner, thermoplastic bag 14 is substantially unbonded to the paper bag 12, the multiwall bag 10 is vastly easier to open than the multiwall bags of the prior art.

Furthermore, by using a multiwall bag 10 having more than one thermoplastic bags 14 containing one or more bulk materials 18 within a single paper bag 12, it is obvious that the method of packaging as taught herein can greatly simplify preparation of such food products as frozen vegetables with sauces. For example, the vegetable can be contained in one color-coded thermoplastic bag 14, while the sauce can be placed in another differently color-coded thermoplastic bag 14. Both such thermoplastic bags 14 can be contained within a single paper bag 12 that was packaged in accordance with the present invention for ease of marketing.

Thereafter, the homemaker can easily open the paper bag 12 and place the two different bags 14 in boiling water or in a microwave oven according to the specific cooking directions therefor. By separating the two components in easily removed thermoplastic bags 14, however, each component can be correctly cooked in accordance with its specific cooking time without endangering the integrity of the other component.

Obviously, many modifications and variations are possible in light of the above teachings. It is to be understood, therefore, that within the scope of the appended claims the present invention may be practiced otherwise than as specifically described herein.

What is claimed is:

1. A method of packaging bulk material in a multiwall bag which includes a ply of uncoated paper which provides an inner surface, comprising the steps of:
   providing a thermoplastic bag, said thermoplastic bag having a top inner surface;
   inserting said thermoplastic bag within the multiwall bag, wherein an outer surface of said thermoplastic bag substantially contiguously contacts the inner surface of said ply of uncoated paper;
   substantially filling said thermoplastic bag with the bulk material;
   ultrasonically sealing the top inner surface of said thermoplastic bag filled with the bulk material through the walls of the multiwall bag and forming a seal between said multiwall bag and said thermoplastic bag that is weaker than the seal of the inner surfaces of said thermoplastic bag; and
   closing said multiwall bag.

2. The method of packaging according to claim 1, wherein said ultrasonically sealing step comprises the steps of:
   providing ultrasonic welding means;
   tacking, with said ultrasonic welding means, said outer surface of said thermoplastic bag to said ply of uncoated paper on said inner surface of the multiwall bag; and
   substantially simultaneously with said tacking step, coupling together an inner surface of said thermoplastic bag with said ultrasonic welding means.

3. The method of packaging according to claim 1, further comprising, before said closing step, the steps of:
   providing one or more additional thermoplastic bags;
   inserting each said additional thermoplastic bag within the multiwall bag, wherein an outer surface of each said additional thermoplastic bag contiguously contacts said ply of uncoated paper on said inner surface of the multiwall bag;
   filling each said additional thermoplastic bag with the bulk material; and
   ultrasonically sealing each said additional thermoplastic bag filled with the bulk material.

4. The method of packaging according to claim 3, wherein the bulk material that is filled within each said additional thermoplastic bag comprises a different bulk material from the bulk material that is filled within said thermoplastic bag.

5. A method of packaging, comprising the steps of:
   providing a paper bag having a closed end and an open end, said paper bag including an outer surface, and an inner surface substantially free of any coating;
   providing a thermoplastic bag, said thermoplastic bag having a closed end, an open end, an outer surface and an inner surface;
   inserting said thermoplastic bag within said paper bag, wherein said outer surface of said thermoplastic bag is in substantially contiguous contact with said inner surface of said paper bag;
   substantially filling said thermoplastic bag with a bulk material through its respective open end;
   causing said inner surface at said open end of said thermoplastic bag to be closed;
   providing ultrasonic welding means;
   sealing, with said ultrasonic welding means through the walls of the paper bag said closed inner surface of said thermoplastic bag and forming a seal between said paper bag and said thermoplastic bag that is weaker than the seal of the inner surfaces of said thermoplastic bag; and
   causing said open end of said paper bag to be closed.

6. The method of packaging according to claim 5, wherein said thermoplastic bag after said inserting step is substantially coextensive with said paper bag.

7. The method of packaging according to claim 6, wherein said thermoplastic bag after its respective filling step extends along a major portion of said paper bag.

8. A method of packaging, comprising the steps of:
   providing a paper bag having a closed end and an open end, said paper bag including an outer surface, and an inner surface substantially free of any coating;
   providing a plurality of thermoplastic bags, each said thermoplastic bag having a closed end, an open end, an outer surface and an inner surface;
   inserting each said thermoplastic bags within said paper bag, wherein said outer surface of each said thermoplastic bag is in substantially contiguous contact with said inner surface of said paper bag;
   substantially filling each said thermoplastic bag with a bulk material through its respective open end;
   causing said inner surface at said open end of each said thermoplastic bag to be closed;
   providing ultrasonic welding means;

sealing, with said ultrasonic welding means through the walls of the paper bag said closed inner surface of each said thermoplastic bag and forming a seal between said paper bag and each said thermoplastic bag that is weaker than the seal of the inner surfaces of said thermoplastic bag;

causing said open end of said paper bag to be closed.

9. The method of packaging according to claim 8, wherein said thermoplastic bags after said inserting step are substantially coextensive with said paper bag.

10. The method of packaging according to claim 9, wherein said thermoplastic bags after their respective filling steps extend along a major portion of said paper bag.

* * * * *